Nov. 18, 1969   W. C. SAEMAN   3,479,138
PROCESS FOR THE RECOVERY OF $P_2O_5$ FROM PHOSPHATIC ORES
Filed March 18, 1968   2 Sheets-Sheet 1

INVENTOR.
WALTER C. SAEMAN
BY
AGENT

United States Patent Office 3,479,138
Patented Nov. 18, 1969

3,479,138
PROCESS FOR THE RECOVERY OF $P_2O_5$ FROM PHOSPHATIC ORES
Walter C. Saeman, Hamden, Conn., assignor to Olin Mathieson Chemical Corporation
Continuation-in-part of application Ser. No. 398,306, Sept. 22, 1964. This application Mar. 18, 1968, Ser. No. 727,115
Int. Cl. C01b 25/12; B01j 6/00
U.S. Cl. 23—165                                11 Claims

ABSTRACT OF THE DISCLOSURE

Phosphorus values in the form of $P_2O_5$ are recovered from phosphate ores reacted with carbon and oxygen-containing gas in a rotary furnace having a vitreous lining held in place centrifugally.

---

Figure 1:
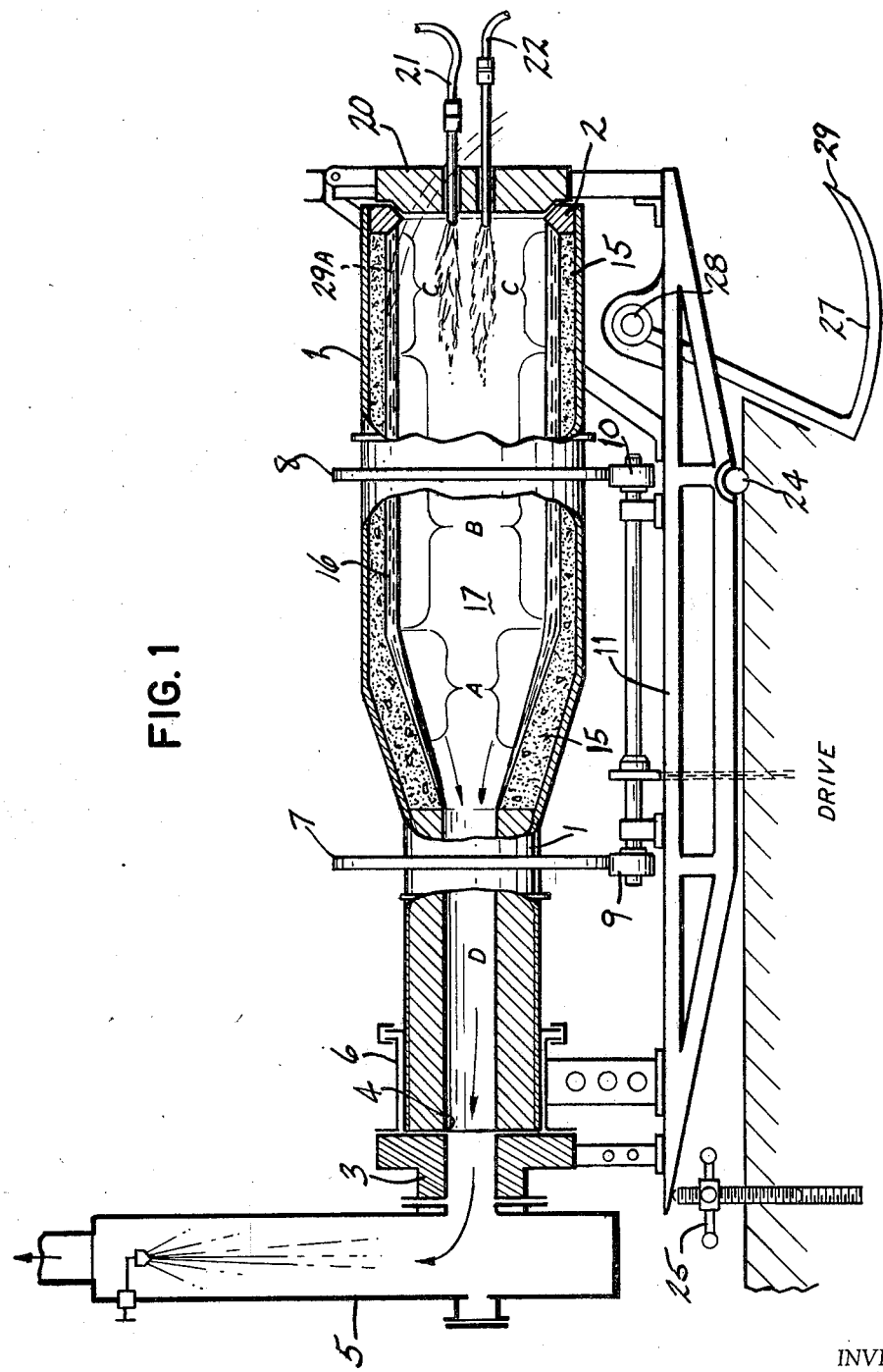

This application is a continuation-in-part of copending application U.S. Ser. No. 398,306 filed Sept. 22, 1964, now abandoned.

This invention relates to pyrochemical processing of raw materials in a furnace and more particularly to the recovery of phosphorus values from phosphate ores.

This invention has as one of its objects provision of improved processing of phosphate ores in a centrifugally rotating furnace.

Another object is a new and improved method of processing phosphate ores for efficient and economic production of $P_2O_5$ directly from phosphate rock. By this method, the cost per ton of $P_2O_5$ is considerably less than by prior art processes.

In conventional electric furnaces and blast furnaces, heat generation and heat distribution are not uniform, principally because the charge materials are poor heat conductors and convection is inadequate. The operation of the present invention avoids these difficulties, improves the efficiency of the operation, effectively reduces dust formation and results in a process stream richer in the phosphorus product. The process of the present invention is carried out in an open cavity furnace in which the charge is fused. The desired products are vaporized and removed from one end of the furnace while slag is removed from the other end of the furnace. Radiation of heat promotes good heat transfer, suppressing dust formation and, surprisingly, affords means for the oxidation of phosphorus to its pentoxide and CO to $CO_2$, greatly increasing fuel economy.

Klugh, in U.S. Patent 1,492,713 maintains a molten slag as reaction medium, heats it by immersing arc electrodes therein and charges the reactants into the molten slag.

Lapple, in U.S. Patent 3,241,917 maintains a reaction mixture of pulverulent reactants and products, covers the reaction mixture with an overlay of free coke to isolate the feed from the oxidizing atmosphere and to insulate the reaction mixture from the radiant heat of the flame. Lapple also limits the temperature to 1500° C. (2732° F.) to avoid sintering and formation of a fluid slag. In Lapple's furnace, two-thirds or more of the refractory insulation is directly exposed to the hot gases at flame temperatures and to the $P_2O_5$ and fluorine compounds contained therein. The resulting heat and corrosion are seriously deleterious to the life of the kiln. Residence times in hundreds of minutes are required compared to residence times of about 1 to 30 minutes in the process of the present invention.

U.S. Patent 2,878,004 discloses and claims rotary furnaces especially suitable for carrying out the process of the present invention. That patent describes the fusion of natural phosphates for defluorination and the fusion of sodium chloride and sodium nitrate where the non-fused granular lining is material of the same kind as that being processed. Rotation of the furnace generates centrifugal force holding a substantial layer of unbonded granular thermal insulation on the inner wall of the furnace shell. Temperature is maintained to fuse the inner surface of the lining material to form the walls of a bowl of fused material adhering smoothly to the underlying unbonded granular material.

U.S. Patent 3,030,094 shows a rotary fusion furnace in conjunction with a rotary preheat furnace. The fusion furnace is fed at one end and heated by a burner at the opposite end where means are provided for removal of the fusion product.

The rotary furnaces of U.S. Patent 2,878,004 are of particular advantage in the chemical reduction of phosphate ores using carbonaceous reducing agents to recover the phosphorus values of the ores as phosphorus pentoxide. However, certain critical operating conditions must be observed and form the basis of the present invention. Under these conditions, surprisingly advantageous and unpredictable recoveries of phosphorus pentoxide are obtained. According to this invention, phosphate ore, for example, phosphate rock, is processed in a kiln having a vitreous liner maintained centrifugally on the walls of an elongated furnace cavity in a temperature range of 2800° F. to 4200° F. using carbon as a reducing agent. The evolved phosphorus and carbon monoxide are oxidized immediately in an oxdizing atmosphere to diminish fuel requirements and to produce phosphorus pentoxide and carbon dioxide.

The furnace is first charged with particulate refractory which is distributed and maintained centrifugally against the shell of the kiln. Sand is particularly preferred as the refractory and the use of sand is particularly detailed here.

The vitreous liner is formed in the furnace by rotating the furnace shell, firing it internally with fuel and oxidizing gases and charging a suitable refractory in particulate form, preferably sand, at either end. The rotation centrifugally forms a bed of loose sand internally on the walls of the furnace and, as firing continues, the sand fuses on the internal surface of the bed. The firing is diminished until the fused liner solidifies to a vitreous lining appropriately from one-half to two inches thick and preferably about one inch thick along the length of the furnace cavity. Sand is fused suitably at about 3200° F. and vitrified by cooling to about 2800° F. Centrifugal action maintains both the vitreous liner and the underlying loose sand over the entire inner surface of the furnace, except in an exhaust zone.

A particular merit of the rotary furnace for phosphate reduction lies in using sand to form a loose bed adjacent the furnace shell and a vitreous protective inner liner. Sand is low in cost and in the process of this invention, provides advantageous and inexpensive linings. The formation of vitreous silica liners in rotary furnaces by centrifugal action from a bed of loose sand circumvents the serious spalling and cracking problem normally encountered with dense silica refractories. The terminal conductivity of the loose sand underlying the fused liner is only 10% that of carbon and about 25% that of fire brick. The silica is most effective as a refractory in vitreous form on the unbonded granular bed of silica.

While sand is preferred as refractory and vitreous liner for this process, lime and limestone have particular advantages in high fusion temperature, insulating value, low cost and performance. Other oxidation resistant refractories are suitable in particulate form for use in this invention, including calcium, magnesium and aluminum silicates, oxides and carbonates. Examples are lime, limestone, magnesia, dolomite and clays. In using the refractories other than silica, silica is advantageously included in the feed to convert the inner surface of these refractories to a fluid slag which flows along the walls of the cavity. It penetrates the underlying refractory, becoming poorer in silica and richer in the base of the refractory. The fusion point increases and the temperature decreases progressively until the slag forms an impenetrable, solid layer on the underlying particulate refractory. This seal prevents further penetration of the slag, protecting the shell of the furnace and maintaining the reactants on the inner walls of the lining.

Alternatively, linings of silica mixed with the oxides of calcium, magnesium, aluminum are useful. They are suitably formed from physical mixtures of silica and the oxide or from chemically combined fusions of the oxides in granular form. The proportions of these oxides are chosen to yield mixtures with fusion points in excess of the melting point of silica. Combinations of these oxides are also suitably formed in the furnace by depositing centrifugally a layer of calcium, magnesium or aluminum oxide which is then covered with silica or a fusible silicate of a lower melting point.

The open cavity of the rotary furnace is fired with fuel gas and with an oxygen-containing gas. The latter is suitably air but preferably is oxygen-enriched air which is commercially and cheaply available. Pure oxygen or oxygen diluted with air is also suitable. When air is used, it is advantageously preheated to at least 1200° F. The fuel gas is suitably natural gas or waste hydrocarbon gases of high fuel value. Oil or powdered coal are also suitably used as fuels. In the process of this invention, the carbon monoxide and elemental phosphorus coproducts are used as all or part of the fuel requirement. The total heat of oxidation of carbon to carbon dioxide and of phosphorus to its pentoxide are thus recovered and utilized in the process of this invention.

Having formed the vitreous liner as described, the introduction of phosphate ore, silica and carbon is started. These are added either as separate streams or they are premxied. The additions are intermittent or continuous. The ratios of carbon to ore and silica to lime are carefully controlled. The feed rate is sufficient to maintain a complete cover over the vitreous lining to protect the vitreous liner and the slag from radiant heat from the flame and from the action of the $P_2O_5$ formed.

Adjustment of feed rate and distribution serves to maintain a continuous covering for the vitreous liner and the slag and prevents the formation of localized hot zones due to overheating bare slag areas by the flame. Such localized hot zones result from too thin a feed layer and cause excessive volatilization of mineral fumes, $P_2O_5$ vapor is reabsorbed by the slag and the superheated slag may melt the liner, penetrating the underlying particulate refractory. Conversely, too thick a covering of feed on the vitreous liner causes the underlying slag to freeze and form a dam behind which molten slag accumulates. If this slag pool becomes too deep, slag cascading occurs, even though furnace shell rotation is above critical speed. Resulting effects are reabsorption of $P_2O_5$ vapor by the slag and gas turbulence which mixes the oxidizing and reducing gas zones, thus increasing direct oxidation of carbon to carbon dioxide and reducing phosphorus volatilization and production rates. These problems are avoided by maintaining uniform feed coverage, suitably 0.5 to 6 inches thick, on the vitreous liner.

When the dry phosphate ore, silica and dry carbonaceous material are introduced as separate streams, they are suitably used "as is," without further preparatory treatment. The phosphate ore most commonly used in the present process is phosphate rock but other phosphate ores are useful, including apatite, fluorapatite, chloroapatite, hydroapatite, francolite and wavellite.

The carbonaceous material is suitably coal, carbon black or coke. Mixed grades of coke ranging from fines to coarse lumps an inch in diameter and even up to 3 inches in diameter are especially advantageous when the coke is fed separately from the ore. The coarser fraction of the coke assures anchorage of these particles in the moving stream of fused slag on the inner liner. This avoids flotation of the coke on the slag and vastly improves reactive contact between the coke and ore. This in turn assures rapid and complete reduction of the phosphorus in the ore. The larger the coke lumps the thicker the layer of fused slag that can be carried without displacement of the coke lumps from the cavity wall. Coke fines are beneficial in that they increase the surface of carbon in contact with the ore while remaining enmeshed among the coarser lumps. Coke fines alone, are undesirable, since when introduced separately, they float on and blanket the feed, preventing radiant heat transfer.

Preferably the average particle size of the coke is at least 4 times as thick as the layer of molten slag. The larger particles of coke do not float but rest solidly on the vitreous liner underlying the fused slag. In this manner, the entire inner surface of the liner is usable as reactive hearth surface for the coke while the molten slag flows past the coke particles in a thin, continuous sheet.

Because coke fines or breeze are considerably cheaper than lump coke, it is particularly advantageous to utilize all fines. This is accomplished by premixing fine coke with finely ground phosphate ore and agglomerating the mixture into pellets. The highest efficiency is achieved when the feeds are dry and the carbon is premixed with the ore prior to injection into the furnace.

More particularly, the rock and the coke are first preground, substantially all passing a 200 mesh screen, blended and granulated suitably in a mixer with the addition of moisture and a binder after which the resulting pellets are dried to pebbles up to about 1 inch in size. The dry, agglomerated mixture is fed into the reaction zone. The reduction proceeds rapidly and is completed at the reaction temperature.

The theoretical carbon requirement for reducing the phosphorous in phosphate to elemental phosphorous is about 1.0 lb. carbon per pound phosphorous. However, to produce the temperatures necessary for the reaction additional carbon is burned to $CO_2$ in an oxygen-bearing gas. In order to achieve proper performance the carbon to phosphorous weight ratio is maintained between about 1:1 to 4:1, preferably 1.6:1 to 2.8:1. This is necessary to supply sufficient carbon to reduce the phosphate values plus an additional increment to provide the carbon which is oxidized.

It is an advantage of the process of this invention that the carbon introduced is suitably burned to carbon dioxide and all of the heat value of the carbon is utilized. It is a further advantage of the process of this invention that the heat of combustion of the phosphorous to its pentoxide is also conserved.

Varying amounts of silica in the ore contribute to the maintenance of the liner but some silica may be removed during the process in the form of calcium silicate slag. To maintain the linear, supplemental amounts of sand are introduced as a separate stream, admixed with the coke or ore streams or included in the pelletized feed. The additions of sand as necessary maintain the lining and the underlying bed when it is particulate sand. The furnace is open-ended and direct visual examination serves to control supplemental sand supply and to maintain the lining in optimum condition and thickness.

Excess silica in the phosphate feed results in progressive build-up of the liner in the feed zone. This positively maintains lining thickness during productive operation. By varying the position for placement of supplemental sand, if necessary, the lining is maintained and local repairs are made. As a further control of cavity shape, the inner surface is readily accessible and is suitably shaped using a mechanical boring bar intermittently to control and equalize local accummulations of less fusible residues in the rock feed.

The silica to calcium oxide weight ratio must be adjusted to be between 0.6:1 and 2.0:1, preferably from 1.0:1 to 1.5:1, to insure that the melting point of the slag is low enough to permit removal of liquid slag from the furnace.

The particle size of the feeds can be varied over a relatively wide range depending on the type of feed selected, method of furnace operation, type of carbon used and method of injecting the solids into the furnace. Preferred procedure involves forming an intimately mixed agglomerate from minus 10 mesh ore, coal, and silica and injecting this agglomerate into the furnace to maintain uniform covering of the vitreous liner. Agglomeration can be accomplished either by low temperature, pressure compacting or by balling, either with or without binders, or by elevated temperature techniques were partial melting of the feed materials provides binding action. Size of the particles of agglomerate is suitably from dust up to about 6 inches.

In operation, once the vitreous liner is formed as described above, the feed of ore and carbon is started either as separate streams or as the premixed agglomerates. The ore and carbon react and radiant heat induces volatilization of the phosphorous with carbon monoxide. The first gas mixture of volatilized phosphorous and carbon monoxide is immediately oxidized to a second gas mixture of phosphorous pentoxide and carbon dioxide in the cavity of the rotary furnace. This permits radiant recovery of the resulting heat values and drives the reaction rapidly. Calcium silicate slag is centrifugally removed from the rock and accumulates in the tapping zone at the firing end of the furnace zone where it is removed periodically or continuously and conveniently by a scoop-like scraper and/or trough.

Intermittent feeding requires feeders which are massive in size and require the opening of the furnace door to inject the feed. In intermittent feeding, the injection of massive amounts of cold feed drops the furnace temperature abruptly below the reaction temperature and the reaction is temporarily arrested. It does not resume until the feed cycle is completed and the furnace temperature recovers to the reaction temperature from stored heat in the furnace or by supplimentary fuel. After the feed charge is consumed by the reaction, the feed cycle is repeated. It is a characteristic of intermittent feed that the reaction also proceeds intermittently in time.

In contrast, continuous feeding injects the furnace feed at a sufficient velocity to reach the remotest boundary of the vitreous liner by velocity and/or gas blast alone. The feed is injected through a small port in the furnace door and in small amounts per unit time. The furnace temperature never drops below the reaction temperature and the reaction is continuously maintained. Continuous feeding is suitably accomplished by injecting the feed fully continuously or in small intermittent feed increments at short time intervals which permits maintaining the reaction temperature and continuous production of product. Example III shows this continuous mode of operation.

A further variant for furnace operation utilizes finely ground, intimately mixed, granulated feed of rock, silica and coke deposited at relatively high speed on a thin layer of fused slag draining along the furnace wall. The object of this approach is to induce effective volatilization of $P_2O_5$ from the feed rapidly by intimate mixing.

By maintaining flame temperatures in the range of 2900° to 4800° F. or higher and by rapidly removing the slag from unreacted feed centrifugally, the reaction temperature is maintained at 2800° to 3600° F. and an advantageously high rate of heat transfer is maintained between the radiant heat of the flame and the feed. Generally, the heat flux is at the rate of 10,000 B.t.u./hr./ft.$^2$ of vitreous liner at a flame temperature of 3200° F., 100,000 B.t.u. at 3800° F. and 350,000 B.t.u. at 4800° F. The feed rate is kept high enough to maintain complete coverage of the vitreous liner and the $P_2O_5$ production rate is about 1 lb./hr./ft.$^2$ of vitreous liner at a flame temperature of 3200° F., 10 lb./hr./ft.$^2$ at 3800° F. and 35 lb./hr./ft.$^2$ at 4800° F.

The feed, including rock, carbon and silica, is introduced intermittently or continuously through the firing end or the exhaust end of the furnace by any suitable mechanism such as a tube or U-shaped trough or the like device delivering the feed into the fusion zone at controlled rates.

FIGURE 1 herewith shows a suitable furnace which comprises a substantially horizontal rotating shell 1 having at the firing end a refractory block 2 in the form of a ring and at the exhaust end a connector block 3 for passage of the gaseous products from exhaust port 4 into quench tower 5. The exhaust end of the furnace is fitted with a centrifugal channel sealing member 6 permitting rotation and some end play without gas leakage.

The shell is provided with tires 7 and 8 supported on driving wheels 9 and 10, respectively, mounted on furnace base 11 for furnace rotation in any suitable manner such as that shown. Rotation holds centrifugally the bed of non-bonded granular material, for example, sand 15 and also the vitreous lining 16.

The granular bed in the shell is laid down with the smallest internal radius nearer exhaust port 4. Within furnace cavity 17, part of the reaction zone is shown at A, part of the reaction zone at B and the tapping zone at C, adjacent end ring 2. Hinged door 20 carries furnace firing means consisting of fuel gas line 21 and oxygen line 22.

Furnace base 11 is provided with horizontal pivot 24 and screw 25 as a leveling member for adjusting the slope of the furnace to control the rate of flow of molten slag and for efficient conversion of the charge. Sufficient slope is provided to cause the fused slag to flow along the liner toward the fire-end of the furnace. The feed is deposited on the walls in the reaction zones A and B and the carbon effects reduction of the phosphate. The accumulation of slag reaching the fire-end of the furnace adjacent dam 2 is removed periodically by scraper 27 suitably in the form of a channel supported on base 11 by pivot 28. End 29 of scraper 27 is moved into position 29A for removing the spent slag.

Figure 2:
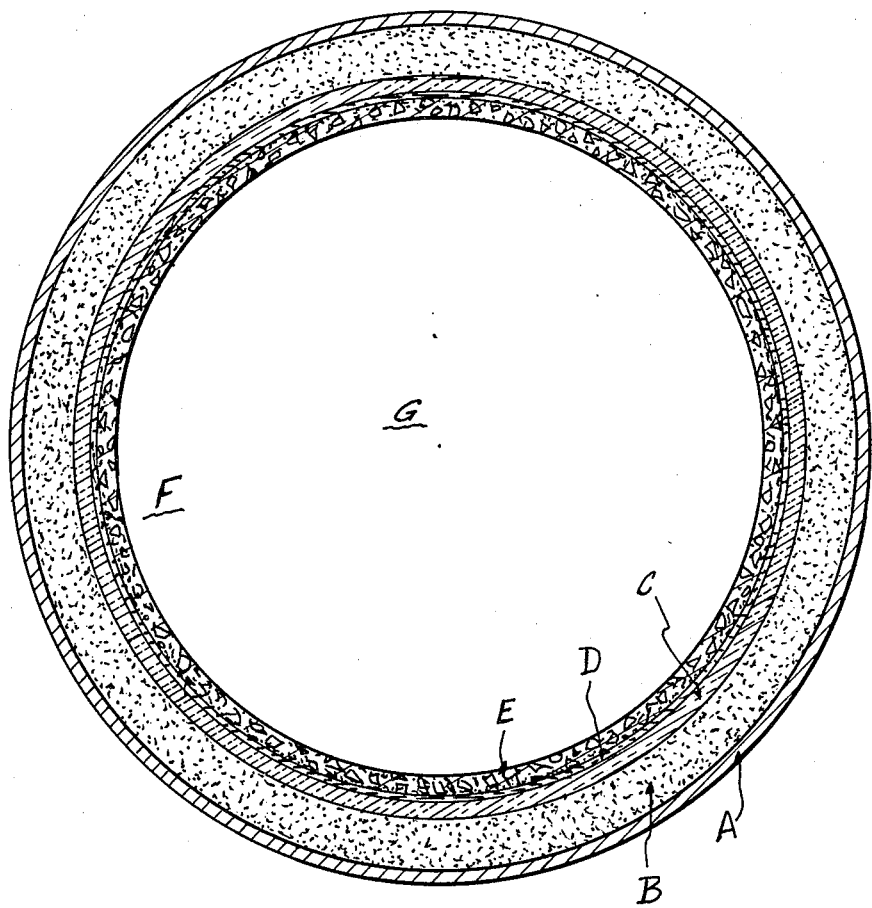

FIGURE 2 herewith shows a cross-section of kiln operation according to the invention. The various zones are identified and suitable thicknesses and temperatures are shown as follows:

| Zone | Description | Thickness, inches | Temp., °F. |
|---|---|---|---|
| A | Shell of kiln | 1–2 | 100–500 |
| B | Particulate refractory | 8–16 | 300–2,800 |
| C | Vitreous liner | 1–2 | 2,600–3,000 |
| D | Slag | ¼–½ | 2,600–3,100 |
| E | Feed | 1–4 | 2,800–3,200 |
| F | Reducing gases | 1–6 | 2,800–3,600 |
| G | Oxidizing gases | 20–200 | 3,100–4,200 |

Gaseous products are removed via exhaust zone D lined with refractory brick.

Among the special advantages of the process of the present invention are:

(1) Low grade ores containing 15% or less of $P_2O_5$ are amenable to economical treatment and recovery of phosphorus values. Pretreatment (defluorination) of the ore is unnecessary.

(2) Recovery of 95% of the phosphorus in the charge is readily attained and the slag contains less than 5% of the initial $P_2O_5$ because reabsorption of $P_2O_5$ by the slag and reduction of $P_2O_5$ by carbon is avoided.

(3) Carbon is the main source of heat at low cost. Conservation and use of radiant heat reduces the costs below previously known processes.

(4) The cheapest coke or coal of unsorted sizes and containing substantial proportions of fines is especially suitable.

(5) Effective utilization of carbon (to carbon dioxide) reduces carbon requirement per pound of $P_2O_5$. Complete production of $CO_2$ and $P_2O_5$ utilizes and conserves all the heat of combustion of carbon and phosphorus in the interior of the furnace. $CO_2$ reduction by carbon is avoided. This is not possible in the blast or electric furnace processes.

(6) More concentrated effluent gases attained with oxygen firing, avoiding inert gas dilution, simplify recovery and reduce costs. Recovery of $P_2O_5$ as "super-acid" (87% $P_2O_5$) avoids concentration processing.

(7) Minimum dust and acid mist minimize the need for electrostatic precipitators.

(8) Continuous furnace operation without lining deterioration reduces costs. The lining is self-maintaining because faults are self-healing. Cracked or perforated liners are avoided. The lining protects refractory from excessive temperatures and from $P_2O_5$ vapors.

(9) Capital costs are low. Phosphate reduction is rapid, process inventory is low and the small, compact furnace has a high production rate. In large scale operations of the process of this invention, the production rate is indicated to be about 20 pounds of $P_2O_5$ per hour per square foot of cross-sectional area of cavity compared with about 10 pounds per hour in an electric furnace.

EXAMPLE I

A furnace, essentially as shown in FIGURE 1, having a diameter of 21 inches and an overall length of 14 feet was lined for 7 feet at its exhaust end with one course of 4 inch thick insulating brick. The fire end of the furnace was lined with an 8 inch thick layer of loose sand retained centrifugally by rotating the furnace at 162 r.p.m. The slope of the furnace was 0.5%.

The furnace was fired by gas and air at about 300,000 to 400,000 B.t.u./hr. to a temperature of about 3200° F. in two to three hours. A thin film of fused silica was formed and vitrified on the interior surface of the sand lining.

A mixture of 4 pounds of phosphate rock and 1.5 pounds of sand was introduced 6 times per hour into the reaction zone of the furnace by means of a guided trough extending 6 feet into the furnace cavity. Each addition of rock and sand was followed by 2.5 pounds of coke. The firing rate was controlled to maintain a temperature of 3000–3100° F. in the furnace.

The pebble rock contained 31.1% $P_2O_5$ and 6.5% $SiO_2$ and showed the following much analysis.

| Mesh: | Cumulative percent |
|---|---|
| +6 | 13 |
| +8 | 25 |
| +12 | 40 |
| +20 | 65 |
| −20 | 100 |

The coke was a mixture of fines to ¾″ lump (70% minus 3 mesh). It contained 10% ash and nominally 90% carbon. The sand was minus 16 plus 30 mesh and was nominally 99% $SiO_2$.

During 4 hours a total of 86 pounds of rock and 50.5 pounds of coke was charged. The coke:rock ratio was 0.59:1, the coke:$P_2O_5$ ratio was 1.76:1 and the coke:P ratio was about 4:1. Average analysis of the slag tapped at intervals showed volatilization of 92% of the $P_2O_5$ charged.

EXAMPLE II

Premixed feed was prepared from ground rock (68% B.P.L.) having 69% through 200 mesh, silica flour and carbon black using the carbon in a ratio of 1.27 pounds per pound of $P_2O_5$ (C:P=3:1). The $SiO_2$:CaO ratio was 0.8:1. The components were thoroughly dry blended and mixed with 2.5% boiled starch as binder. The mix was air-dried and broken into 1 inch lumps. This feed contained about 5% fines.

The vitreous silica liner was prepared in the rotary furnace as described in Example I, except that the furnace slope was 5%. The premixed feed was introduced into the reaction zone at a rate of 4 pounds every 5 minutes. The temperature was maintained at 2900° F. using oxygen at 650 cubic feet per hour. Slag was tapped at 10 minute intervals. Analyses showed about 71% volatilization of $P_2O_5$.

EXAMPLE III

The furnace of Example I was loaded with finely ground dolomite and rotated at 170 r.p.m. with a slope of 2% to form the furnace cavity. The furnace was fired to 3000° F. and charged with 10 pounds of sand to form the liner.

Phosphate rock was fed pneumatically in 5 pound increments over 2.5 hours. Each increment was followed by one or two pound additions of coke breeze (−½ inch). Total rock was 100 pounds and total coke was 26 pounds (C:P=2.1:1). Average temperature was about 3250° F.

$P_2O_5$ volatilization was over 90% and at the end of the run the refractory was in loose form under a vitreous inner liner.

EXAMPLE IV

A kiln similar to the kiln used in Examples I, II and III but having overall length of about 14 feet and outside diameter of 40 inches was lined with insulating fire brick, charged with sand and rotated at 110 r.p.m. to provide an axial cavity about 18 inches in diameter. Propane and oxygen were burned in the kiln. A vitreous lining 1½ to 2 inches thick was formed in the kiln by fusing the sand and then cooling to about 3000° F. until the lining was vitreous.

A feed mixture was introduced intermittently in portions into the kiln at a rate of 510 lb./hr. maintaining the temperature in each of several runs as indicated in Table I. The feed was an agglomerated mixture of coal, sand and phosphate rock in proportions by weight of 0.5:0.42:1.0 respectively. The rock assayed 68% B.P.L. (bone phosphate of lime) and the weight ratio of C:P in the feed was 2.1:1. The $P_2O_5$ production rate is shown in Table I in pounds per hour per square foot of vitreous liner. The $P_2O_5$ was absorbed from the exit gas in aqueous phosphoric acid for recovery. Recovery was calculated as the difference between $P_2O_5$ in the charge and $P_2O_5$ remaining in the slag by analysis.

TABLE I

| | Effect of temperature | | |
|---|---|---|---|
| Run No. | Temp., °F. | $P_2O_5$ recovery, percent | $P_2O_5$ produced |
| 4 | 3,175 | 91 | 2.8 |
| 5 | 3,125 | 87 | 2.7 |
| 6 | 3,100 | 83 | 2.6 |
| 3 | 3,075 | 83 | 2.6 |
| 7 | 3,050 | 90 | 2.4 |
| 8 | 3,025 | 79 | 2.4 |
| 9 | 2,975 | 79 | 2.4 |
| 10 | 2,950 | 75 | 1.9 |

EXAMPLE V

The kiln was operated generally as described in Example IV but the temperature was maintained at 3025° F. and the weight ratio of C:P in the feed was varied while maintaining a constant sand/ore ratio of 0.42/1. The feed rate was about 510 lb./hr. The $P_2O_5$ was produced at a rate of about 2.3 lb./hr./ft.$^2$ of vitreous liner. Table II shows good $P_2O_5$ recovery over a wide range of C:P feed compositions.

TABLE II

| | Effect of C/P₂O₅ in feed | |
|---|---|---|
| Run No. | C:P in feed | P₂O₅ recovery, percent |
| 11 | 2.36 | 81 |
| 12 | 2.06 | 84 |
| 13 | 1.97 | 81 |
| 14 | 1.74 | 72 |
| 15 | 1.70 | 67 |

EXAMPLE VI

The kiln was operated generally as described in Example IV but the temperature was maintained at 2975° F. and the feed composition was maintained at 0.5 coal/0.42 sand/1.0 ore (68 B.P.L.). C:P 2.1:1 and $SiO_2$:CaO was 1.0:1. Table III shows that $P_2O_5$ recovery and production of $P_2O_5$ in lb./hr./ft.² of vitreous liner improved with increasing feed rates up to 600 lb./hr. in this size kiln.

TABLE III

| | Effect of feed rate | | |
|---|---|---|---|
| Run No. | Feed, lb./hr. | P₂O₅ recovery, percent | P₂O₅ produced |
| 16 | 600 | 84 | 2.7 |
| 17 | 500 | 79 | 2.4 |
| 18 | 430 | 75 | 1.9 |

EXAMPLE VII

The kiln was charged and the vitreous lining was formed as described in Example IV. A well-blended mixture of pulverized coal, sand and phosphate rock in a weight ratio of 0.5/0..42/1 was charged to the kiln while maintaining the temperature at about 2900° F. The $P_2O_5$ charge rate was 5.2 lb./hr./ft.² of vitreous liner. $P_2O_5$ recovery was 71.6% and production rate was 3.7 lb./hr./ft.² of vitreous liner.

What is claimed is:

1. In the thermochemical process for recovery of $P_2O_5$ from phosphatic ores wherein a feed of silica, carbon and the phosphatic ore is heated to produce a slag and a first gaseous mixture of $P_4$ and CO; said first gaseous mixture is heated with an oxygen-containing gas to form a second gaseous mixture of $P_2O_5$ and $CO_2$; and $P_2O_5$ is separated from said second gaseous mixture; the improvement of:
 (1) distributing and centrifugally maintaining a bed of particulate refractory in a rotating kiln;
 (2) fusing the inner surface of said refractory and cooling, the resulting fused surface to form a centrifugally maintained vitreous lining on said refractory;
 (3) distributing and centrifugally maintaining said feed on said lining;
 (4) burning oxygen-containing gas and fuel in said kiln to produce heat and flame, thereby maintaining the reaction temperature between about 2800° and 4200° F., forming said slag and said first gaseous mixture and converting said first gaseous mixture to said second gaseous mixture;
 (5) centrifugally transferring said slag from said feed to said liner thereby maintaining radiant heat exchange between said flame and said feed; and
 (6) removing said slag and said second gaseous mixture as separate streams from said kiln and separating $P_2O_5$ from said second gaseous mixture.

2. Process as claimed in claim 1 in which said feed is agglomerated and has a particle size from dust up to 6 inches in diameter.

3. Process as claimed in claim 1 in which the weight ratio of C:P in said feed is from 1:1 to 4:1 and of $SiO_2$:CaO is from 0.6:1 to 2.0:1.

4. Process as claimed in claim 1 in which said feed is introduced at a rate of at least about 1 pound of $P_2O_5$ per hour per square foot of vitreous lining.

5. Process as claimed in claim 1 in which the rate of heat transfer from said flame to said feed is at least 10,000 B.t.u. per hour per square foot of vitreous lining.

6. Process as claimed in claim 1 in which said oxygen-containing gas is oxygen enriched air.

7. Process as claimed in claim 1 in which said oxygen-bearing gas is air preheated to a temperature of at least 1200° F.

8. Process as claimed in claim 1 in which said oxygen-bearing gas is oxygen.

9. Process as claimed in claim 1 in which said feed is introduced continuously.

10. Process as claimed in claim 1 in which said centrifugally maintained bed of particulate refractory is substantially horizontal.

11. Process as claimed in claim 1 in which said vitreous lining is silica.

References Cited

UNITED STATES PATENTS

| 1,492,713 | 5/1924 | Klugh | 23—165 |
| 2,687,947 | 8/1954 | Manning et al. | 23—177 |
| 2,878,004 | 3/1959 | Saeman | 263—32 |
| 3,241,917 | 3/1966 | Lapple | 23—165 |

HERBERT T. CARTER, Primary Examiner

U.S. Cl. X.R.

23—150, 279; 263—32